K. Vogel.
Weaving Heddle
N° 5,339.
Patented Oct. 23, 1847.
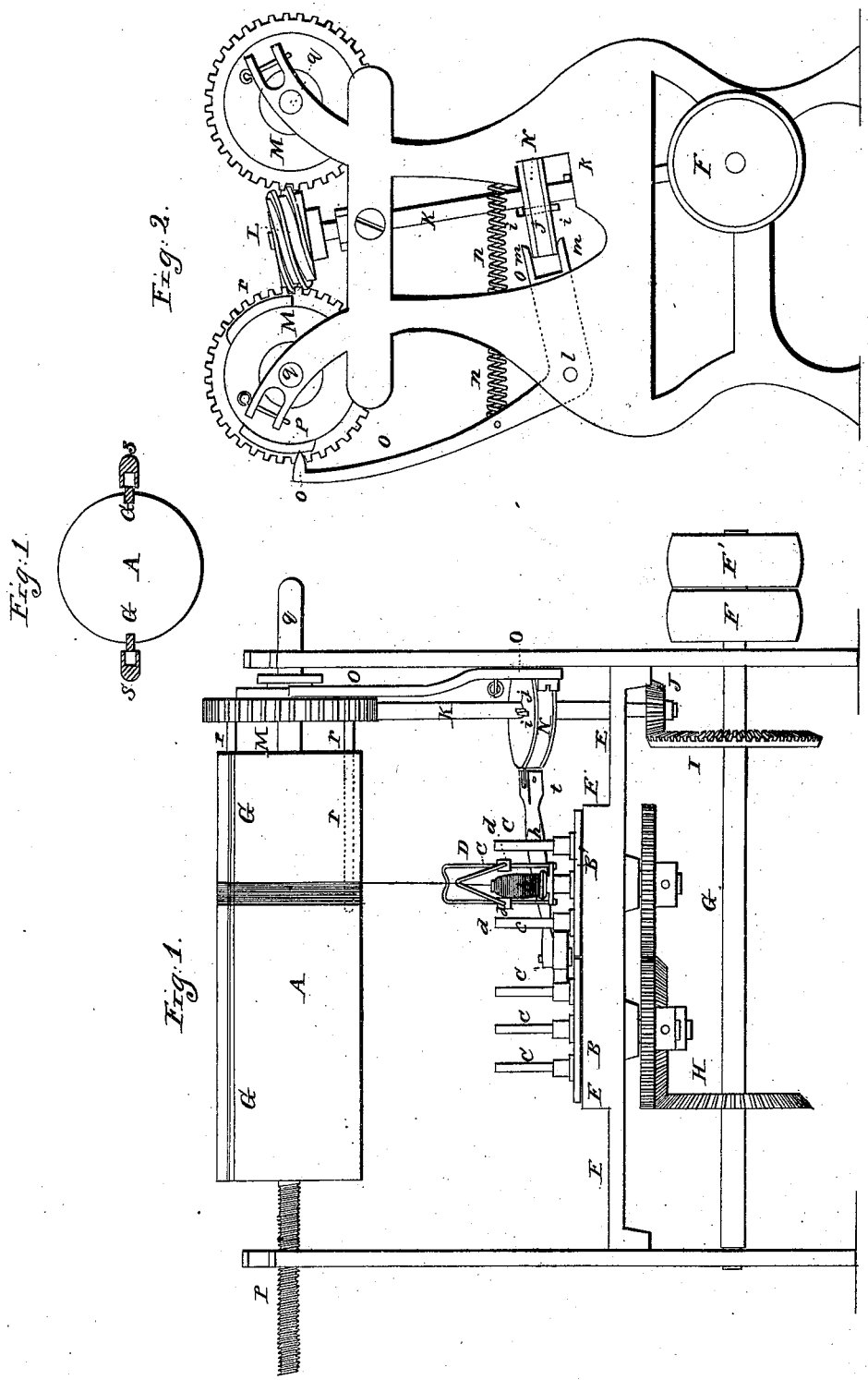

K. Vogel.
Weaving Heddle.

No. 5,339.                    Patented Oct. 23, 1847.

UNITED STATES PATENT OFFICE.

KASIMIR VOGEL, OF LOWELL, MASSACHUSETTS.

MACHINERY FOR MAKING WEAVERS' HARNESS.

Specification of Letters Patent No. 5,339, dated October 23, 1847.

*To all whom it may concern:*

Be it known that I, KASIMIR VOGEL, of Lowell, in the county of Middlesex and State of Massachusetts, have invented a new and useful Machine for the Manufacturing of Weavers' Harness; and I do hereby declare that the following is a full and exact description thereof.

The harness which is to be manufactured by means of the machine which I am about to describe, has the heddles of which it is composed made of cord, or twine, and these are to be formed in the manner described in the specification of Letters Patent for "a new manufacture of weavers' harness," an application for which has been filed in the Patent Office of the United States simultaneously with the present application; and it is to be understood that in describing this machine I use the term harness, to designate the apparatus to be formed by it in its finished state when prepared for use in the loom, and that by the term heddles, I intend the individual threads, or cords, which when combined together constitute the harness.

In the accompanying drawing the machine is represented as adapted to the making of two sets of harness, at the same time.

Figure 4:
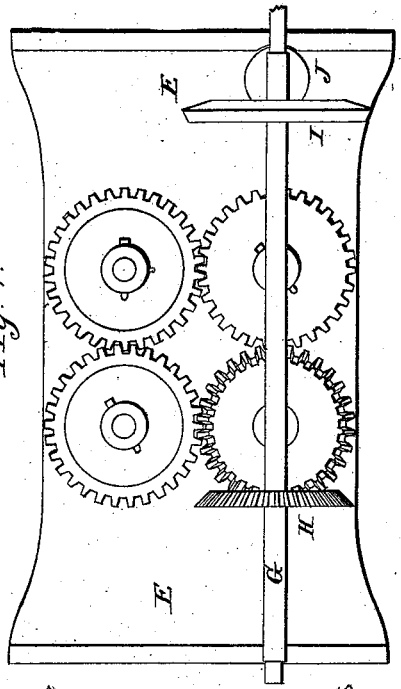
Figure 3:
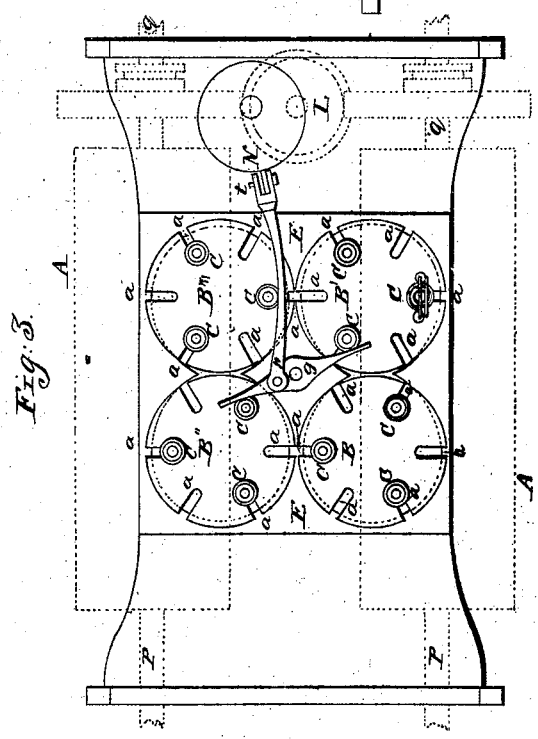

Figure 1, is a side elevation thereof. Fig. 2, is an end elevation of it. Fig. 3, a top view of the revolving tables and spindles; the cylinders around which the heddles are to be wound being removed, and their place represented by red lines, as is also the worm wheel by which they are to be driven. Fig. 4, is a view of the under side of the machine, showing the gearing by which the tables that carry the spindles are made to revolve.

In each of the figures where the same parts are represented, they are designated by the same letters of reference.

A Fig. 1, is one of the cylinders around which the heddles are to be wound as the doubling and twisting proceeds; there are two such cylinders the places of which are shown by the red lines in Fig. 3.

B, B', B'', B''' are revolving tables; each of which is to carry three spindles which are received in notched recesses *a, a, a,* made in them for that purpose. Each table has six such recesses, three of which are to be occupied by spindles while the doubling and twisting is going on, there being an occupied and an unoccupied recess alternately; an occupied recess being brought opposite to one that is unoccupied in its fellow table as the respective pairs revolve. The tables B, and B', constitute one pair, and the tables B'' and B''' another pair, the two pairs forming two distinct harnesses; but being driven by the same gearing.

C, C, are spindles, each of which is to be furnished with a flier D, and each spindle is to carry a spool *b*, furnished with suitable yarn. The yarn passes up through a hole in the top of the fliers, or over a depression calculated to hold it in place, and it then passes under a recurved wire *c*, that is furnished with a perforated weight *d*, at each end, through which perforations the legs of the fliers pass, and serve as guides to the weights. The use of this device is to take up the requisite quantity of the slack of each yarn, as from the operation of the machine the yarn cannot be kept in an equal state of tension, the spindles being alternately shifted from one table to the other for a purpose to be presently described.

Figure 6:
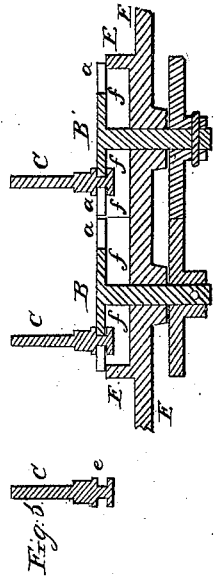

The form of the spindles is shown in Fig. 5, which is a vertical section through the axis of one of them; Fig. 6, is a similar section through two of them, and through the revolving tables, and the platform E, that sustains them.

The spindles have each a groove *e*, in its lower part, which is adapted to the recesses *a*, of the tables along which they may be slid from one to the other when the recesses coincide. The platform E, has circular cavities *f, f,* made in it to allow the lower ends of the spindles to revolve within them.

F, F', are a fast and loose pulley on the driving shaft G, a bevel wheel H, on said shaft gives motion to the revolving tables by an arrangement of toothed wheels, which will be readily understood by an inspection of Fig. 4. It also carries a beveled wheel I, that gives motion to the cylinders A by gearing into a small bevel wheel J, on the lower end of the shaft K. This shaft carries a worm wheel L, that gears into the toothed wheels M, M', that drive the cylinders A. N, is an eccentric on the shaft K, said eccentric operating as a crank to vibrate a sword or shipper *g*, by which the spindles are transferred from one table to the other, the opposite ends of said shipper operating on the two pairs of tables; *h*, is the connecting rod that vibrates the shipper. The eccentric N is loose upon the shaft K and turns with it by means of clutch pins, and when these are not engaged the shaft will turn without turning the eccentric. In Fig. 2, $i, i$, is a pin that passes through the body of the eccentric wheel N, projecting out above and below it, nearly in contact with the shaft K; $j$, and $k$, are clutch pins that project out from the shaft K, and as the eccentric wheel is made to slide up and down upon the shaft, either of the clutch pins may be brought into contact with the pin $i, i$, on the eccentric.

O, Fig. 2, is a forked lever, that has its fulcrum at $l$; its forked ends $m, m$, embrace the eccentric N, and serve to raise and lower it at the proper times; $n$, is a spiral spring attached to the forked lever, serving to draw it inward, to depress the eccentric, and to cause it to clutch with the lower clutch pin, when said lever is not held out by force; $o$, is the upper end of the forked lever, and $p, p$, are lifting pieces on the face of the toothed wheel M, which pieces when they come into contact with the end $o$, of the forked lever, force it out, and raise the eccentric so as to engage with the upper clutch pin at the times required.

The cylinders A, are made to slide regularly endwise as they revolve; for this purpose their axis, at one end, consists of a screw P, that is tapped into the frame of the machine and causes the cylinder to move regularly endwise during its whole revolution, the pitch of the screw being such as to adapt it to the distance of the heddles from each other, which are thus wound spirally and regularly around the cylinders; the cylinders slide endwise on their axes $q$ and on the guide rods $r, r$.

Q, Q, are rods that may be inserted into grooves made to receive them in the cylinder, there being two such opposite to each other; these are shown also in the section of the cylinder A, Fig. 1. The diameter of the cylinder must be such as that its semi-circumference shall be equal to the intended length of the heddles, after the number of heddles required for the harness have been thus formed and wound upon the cylinder, grooved pieces may be slipped over the rods Q, Q, and glued upon them, so as to embrace the twisted strands, as shown in the cross section Fig. 7, where $s, s$, are the grooved pieces, that are thus made to constitute, in part, the rods, or shafts of the harness. The heddles may, however, be made fast to a cord as is frequently done, or may be combined in any other mode that may be preferred. To render it easy to remove the harness from the cylinders, I usually make each of the latter in two pieces, longitudinally and unite the parts together by screws in such manner as to allow the two portions, slightly to approach each other, and thereby to lessen their circumference to a sufficient extent for the ready removal of the harness.

The connecting rod $h$, has a hinge joint at $t$, allowing it to be lifted off from the pin on the sword, or shipper $g$, which is to be done at the proper time by the attendant, and it is to remain off during the time that the two strands are to be doubled and twisted that are above and below the eye; when the eye is to be formed the connecting rod is to be replaced and again removed for the forming of the sides of the eye. The spindles on the two pairs of tables are moved by the opposite ends of the same shipper. The small bevel wheel J, on the bottom of the shaft K, is, (when there are three spindles), one-third of the diameter of the driving wheels, and makes, therefore, three changes of the spindles in one revolution of the revolving tables; (were there four spindles the wheel J, should be one-fourth of the diameter of the driving wheels). The three spindles on one table have to be passed over, into the three spaces on the corresponding table, and after the eccentric has performed this office they have to be changed back again in order to recross; and to effect this it is necessary that the eccentric should remain at rest during one-half of a revolution, which half revolution represents the distance from one recess $a$, to another, or one-sixth of the circumference of the revolving tables, as the whole revolution represents one-third. This rest of the eccentric during the period that would be due to one half revolution result from the clutch pins $j$, and, $k$, being placed on the opposite sides of the shaft K, as, when the eccentric wheel is raised or lowered, and disengaged from one of the clutch pins the shaft K, must perform a half revolution before the other is made to clutch as this brings the vacant recesses opposite to those containing a spindle preparatory to their recrossing from one table to the other.

Figure 7:

By the procedure, and use of the machine above described the parts of the heddles marked $u, u$, Fig. 7, will consist of two similar strands continued to such length as is necessary to it above and below the eye, each strand consisting of three threads of yarn, doubled and twisted. At the points $v, v$, the six yarns that compose the two strands are made to cross and recross, and thereby become interlocked so as to form the ends of the eye. The loop, or eye, at $w$, consists of two strands formed in the same manner with the strands $u, u$, these being continued to such length only as is necessary to form that part. Each of the heddles which are to form the harness, when thus manufactured, consists of a continuous strand, running from one end of it to the other, without the formation of a knot or other enlargement where the eyes terminate; a characteristic not existing in harness manufactured in any of the ordinary modes.

Having thus fully described the manner in which I construct my machine for the making of Weaver's harness, and shown the operations of the same, what I claim therein as new, and desire to secure by Letters Patent, is—

1. The manner of arranging and combining the cylinders A, so as to operate in the manner described; the yarn from the spools passing up to and being wound on said cylinders, as it is doubled, and twisted, and interlocked; the cylinders also being carried regularly forward by means of the leading or guide screws P, so that the whole harness is formed by the successive winding of the heddles; and these respective combinations I claim whether the parts be formed and arranged precisely in the manner herein set forth and represented, or in any other that is substantially the same in principle, effecting the same end by means substantially the same.

2. I also claim the combination and arrangement of the respective parts of this apparatus, arranged substantially as described by which the respective threads are all doubled, twisted and braided together to the required extent, and then formed into two distinct cords by doubling and twisting, alternately, in the manner and for the purpose herein set forth.

KASIMIR VOGEL.

Witnesses:
   THOS. P. JONES,
   EDWIN L. BRUNDAGE.